UNITED STATES PATENT OFFICE.

JOSEPH HURD, JR., OF BOSTON, MASSACHUSETTS.

IMPROVED PROCESS OF MANUFACTURING SUGAR FROM BEETS.

Specification forming part of Letters Patent No. 855, dated July 26, 1838.

*To all whom it may concern:*

Be it known that I, JOSEPH HURD, Jr., of Boston, in the State of Massachusetts, have invented an Improved Mode of Manufacturing Sugar from Beets, by which the process is so much facilitated as to enable every cultivator to perform it in his own family with great economy and efficiency, the apparatus employed not being costly in the first instance, and the operation being carried on principally by means of such utensils as every farmer already possesses, of which the following is a specification.

The beets, after being taken from the ground and freed from all extraneous matter, are to be cut into slices, the thickness of which should not much exceed one-eighth of an inch. I have invented a machine for the purpose of performing this operation, which is more effective than any other with which I am acquainted, and for which I have obtained Letters Patent of the United States. The beets are to be taken out of the ground as soon as they are perfectly matured, and are to be then stored in a cellar or other suitable place, as otherwise they rapidly undergo a change unfavorable to the production of sugar. They are to remain in this situation until the arrival of the time for slicing and drying them. The proper period for this operation is the earliest season of frost, as in my process they are to be exposed to a freezing temperature, so as to freeze and dry them in the air immediately after they are cut. This freezing is an essential point in my process. This, together with the dispensing with the use of lime and the producing of sugar without molasses, may be denominated its characteristic features.

To dry the beets, after slicing them they may be spread out upon cloths or upon netting, or in any other manner in which they will be most completely exposed to the frost and to the wind. The desiccation, when sliced as above directed, requires but a short space of time, and is effected without injury to the saccharine principle. After being thus frozen and dried, the subsequent steps of the process may be performed at any time, as not the slightest injury will result from keeping the beets in a dry state for any length of time.

When it is desired to proceed to obtain the sugar from the beets immediately, they may be subjected to the freezing process only, then thawed, and submitted to pressure. They will then readily yield the greater part of their juice, which they would not have done if pressed prior to their being frozen. The pressed slices with the residuum of the sugar contained in them, may afterward be dried and kept as food for cattle.

When the sugar is to be extracted from the dried beets, which may be done at any season, they are to be steeped in pure water, which will take up all the soluble matter—an effect consequent upon the change produced in the beet by freezing. The quantity of water need only be such as shall suffice to cover the beets, and may be about one-half of that which was lost in the process of drying.

The soluble material consists principally of the sugar, the mucilage, and a portion of coloring-matter.

To free the sugar from the mucilage and coloring-matter, I generally acidulate the water before pouring it upon the dried beets by adding to it a minute portion of sulphuric acid. The quantity of this cannot be easily designated, otherwise than by observing that it must be no greater than shall suffice to render the acid taste perceptible. Sometimes I add the water alone, and after allowing a sufficient length of time for it to take up all the soluble matter, which may be from three to four hours when cold water is used, but a much shorter period will suffice with hot water, I drain off and press out the solution from the residual matter, and then add thereto the sulphuric acid, as before directed. In the former mode but little of the mucilage and coloring-matter are taken into solution. In the latter they are precipitated or so far disengaged from their combination with the sugar that they separate in the form of scum, and are readily removed when the liquid is boiled. The liquid thus prepared is to be put into a boiler and placed over a fire, a portion of the white of eggs or other fining being added. When brought to a boiling-heat a scum will rise, which is to be removed after damping or taking the kettle from the fire, which is to be repeated as long as any scum rises.

The next operation is to filter the liquor through animal charcoal, ivory, or bone-black. A stratum of two or three inches in thickness will suffice for every useful purpose when the previous preparation has been as above directed. The sirup will come through perfectly fine, and nearly as colorless as water. There will, however, be a very slight yellowish-green tinge, resulting apparently from the presence of a peculiar principle in the beet. This material separates when crystallization takes place. Although its quantity is minute and its weight scarcely appreciable, it will, if left among the crystals, occasion an adhesiveness of the particles and a tendency to deliquesence. It should therefore be got rid of, and this is easily effected. All that is necessary is to pour a quantity of white sirup upon the crystallized sugar after it has been pressed, so as to moisten it throughout and then press it again. This operation requires but little time, and should be repeated until the sugar is fit to pack.

The evaporating of the water from the sugar preparatory to its crystallization may be in great part performed over an open fire without danger of injury. It may be completed by placing the evaporating-pan in a vessel of water kept at about 150° of Fahrenheit's thermometer. When this is performed early in the season, or by taking beets which have been frozen and dried at the proper time, there will not be the smallest portion of molasses produced, the whole of this sugar being crystallizable. In very cold weather a large part of the water may be removed in the form of ice by allowing it to freeze, and much labor and fuel be thus saved. When the clarified sirup is sufficiently concentrated, small brilliant crystals will appear upon the sides and bottom of the vessel, and a crust soon forms over the surface of the liquor. The crystals go on increasing in size, and that portion of the sirup from which the air is excluded continues in a perfectly clear and liquid state; but if the sirup be at this time stirred it becomes opaque and of a milky whiteness. A deposition of fine white sugar then takes place, and whatever of impurity may have remained in the liquor will rise to the surface. This portion crystallizes more slowly than the other; but by drawing it off and again exposing it to heat it will readily form good sugar.

Having thus fully described the process which I have devised for the manufacturing of beet-sugar, I do hereby declare that what I claim as my invention, and desire to secure by Letters Patent, is—

The preparing of the beets for the subsequent steps of the process by exposing them in thin slices to the action of frost, after which they may be directly thawed and submitted to pressure, or they may be dried by a current of cold air and treated in the manner set forth at any convenient time, it being always observed that when the process for the extraction of the sugar is commenced it must be completed without delay, as upon this depends the ability to produce the sugar without molasses and without the employment of lime to correct acidity.

JOSEPH HURD, Jr.

Witnesses:
  LINTON THORN,
  C. H. A. SILTBERGER.